United States Patent [19]

Jeanneret

[11] Patent Number: 5,079,022
[45] Date of Patent: Jan. 7, 1992

[54] MOLD DISPLACEMENT METHOD FOR FIXED SURFACE TYPE FORMING MACHINE

[75] Inventor: Rolando Jeanneret, Vina del Mar, Chile

[73] Assignee: Comercial e Industrial Ausonia Ltda., Vina del Mar, Chile

[21] Appl. No.: 582,061

[22] Filed: Sep. 14, 1990

[30] Foreign Application Priority Data

Jul. 6, 1990 [AR] Argentina ............................. 317323

[51] Int. Cl.⁵ ................................................. A23G 7/00
[52] U.S. Cl. .................................. 426/515; 99/450.6; 426/660
[58] Field of Search .................. 426/515, 660, 524; 425/117, 134; 99/450.6

[56] References Cited

U.S. PATENT DOCUMENTS 3,769,039 10/1973 Kleinert ............................. 426/660
3,798,337 3/1974 Abalo ................................ 99/450.6

*Primary Examiner*—George Yeung
*Attorney, Agent, or Firm*—Cushman, Darby & Cushman

[57] ABSTRACT

The present invention provides a travel sequence for molds in a chocolate forming plant of the fixed surface type wherein the width of the travel front or number of molds fed is changed for different stages of the forming process. Thus, for example, in accordance with the invention molds are filled one by one but are fed in groups of two or more to cooling tunnels so as to maximize the efficiency of the system.

1 Claim, 1 Drawing Sheet

MOLD DISPLACEMENT METHOD FOR FIXED SURFACE TYPE FORMING MACHINE

BACKGROUND OF THE INVENTION

1. Field of the Invention

The present invention relates to the sequence of movement of molds in a fixed surface forming machine which maximizes the production capacity of the forming plant keeping cost low in by substantially reducing the requirements of physical space typically associated with an increase in production.

2. Description of The Related Art

In every chocolate forming plant, molds are used which have cavities that defined the shape of the product to be formed. The forming process in a chocolate forming plant in general includes three stages: deposit of chocolate in the mold cavities, cooling of the chocolate, and removal of cooled chocolate shapes from the mold.

Cooling is effected in tunnels which are refrigerated at a temperature of close to 5° C. The time that the mold is retained within the cooling tunnel depends on three factors: the thickness of the chocolate bar, the surface exposed to the cold and the cooling capacity of the tunnel. There is, however, a minimum residence time given by the very nature of the product. For example, chocolate should not be cooled to a temperature under 0° C to avoid condensation and loss of brightness. In addition, because of the fatty material content of chocolate, the temperature decrease will not be immediate. Indeed, chocolate has a thermal inertia that requires a predetermined minimum cooling period inside the tunnel.

Depending upon the type of chocolate forming plant, the movement of the mold is achieved by one of three systems. The first is a dragging chain which moves the entire line of molds in the chocolate forming plant. Mold carrying frames are attached to the links of the chain and thus maintain each mold fixed in its position.

The second system for moving molds is a conveyor belt that displaces the mold without using mold carrying frames.

Finally, there is the fixed surface system wherein it is the molds that are displaced on a fixed surface.

In conveyor chain and conveyor belt systems the molds are conveyed because the surface, either of the chain or the belt, is in motion. In the fixed surface system, on the other hand, the molds are located on a smooth, fixed surface and the molds are pushed by a hydraulic, pneumatic or other mechanical system located at the end of the line. The molds push one another continuously. All three systems typically move one mold after the other.

In any chocolate forming plant using the "shell" system, the sequence of the movement of the molds is as follows:

| Process | No. of Molds |
| --- | --- |
| Chocolate deposit | 1 |
| Dumping of molds and "shell" forming | 1 |
| Cleaning edges of mold shells | 1 |
| Sequentially cooling molds | 1 |
| Filling molds | 1 |
| Cooling mold and filling | 1 or 2 |
| Total filling of mold | 1 |
| Cleaning surface of filled mold | 1 |
| Cooling of filled, cleaned molds | 1 or more |

The aforementioned systems present some disadvantages regarding the efficient use of the deposit relation, "shell" formation and cooling tunnels.

When the displacement of the mold is carried out by means of dragging chains or conveyor belt, to minimize the space required for the cooling tunnels, vertical tunnels with mold elevators are used and the same chain or belt is used to lift and displace the mold along the upwards and downwards run inside a vertical cooling tunnel.

However, vertical tunnels are very expensive, difficult to regulate and molds frequently become stuck inside the vertical cooling tunnel.

When the mold are themselves displaced on a fixed surface, the use of vertical tunnels is avoided but this requires the use of very long cooling tunnel(s) as the molds move in sequence without changing level. As a result, the forming plant requires a great deal of space for the cooling tunnel(s).

SUMMARY OF THE INVENTION

The present invention provides a new and novel scheme for the sequence of movement of chocolate molds, applicable to the forming process on a fixed surface, for maximizing the production capacity of a forming plant while keeping costs low and substantially reducing the requirements of physical space while providing for increased production.

The sequence of movements of the molds in accordance with the invention combines the travel speed of the molds at different stages of the forming process with different area dimensions of the two cooling tunnels required for the process. According to the invention, the molds do not advance one by one at all stages of the forming process but are grouped by twos or fours to enter the cooling tunnels. Thus, the sequence of movement of the molds according to the invention is as follows:

| Process | No. of Molds |
| --- | --- |
| Chocolate deposit | 1 |
| Dumping of molds | 2 |
| Cleaning edges of chocolate "shells" | 2 |
| Cooling molds | 2 |
| Deposit of filling in molds | 1 |
| Cooling of molds with fill | 2 |
| Total filling of molds | 1 |
| Cleaning mold surface | 1 |
| Cooling of completely filled molds | 2 to 4 |

The forming system or travel sequence according to the invention thus has a number of advantages. First, at all dosing stages, only one mold is processed at a time. This allows small dosing hoppers to be provided and obviously a lower cost than if the hoppers were to simultaneously deposit chocolate in two or more molds.

The dumping system in accordance with the invention increases capacity by holding and dumping two molds simultaneously.

Likewise, simultaneously cooling two molds in the first tunnel doubles the capacity of the system without doubling the length of the cooling tunnel.

Finally, cooling two molds simultaneously and then four molds simultaneously, in the second tunnel, the cooling time of the chocolate in the tunnel and production is doubled without doubling the length of the cooling tunnel.

Other objects, features and characteristics of the present invention, as well as the methods of operation and functions of the related elements of the structure, and the combination of parts and economies of manufacture, will become more apparent upon consideration of the following detailed description and the appended claims with reference to the accompanying drawings all of which form a part of this specification, wherein like reference numerals designate corresponding parts in the various figures.

DETAILED DESCRIPTION OF THE PRESENTLY PREFERRED EXEMPLARY EMBODIMENT

Figure 1:
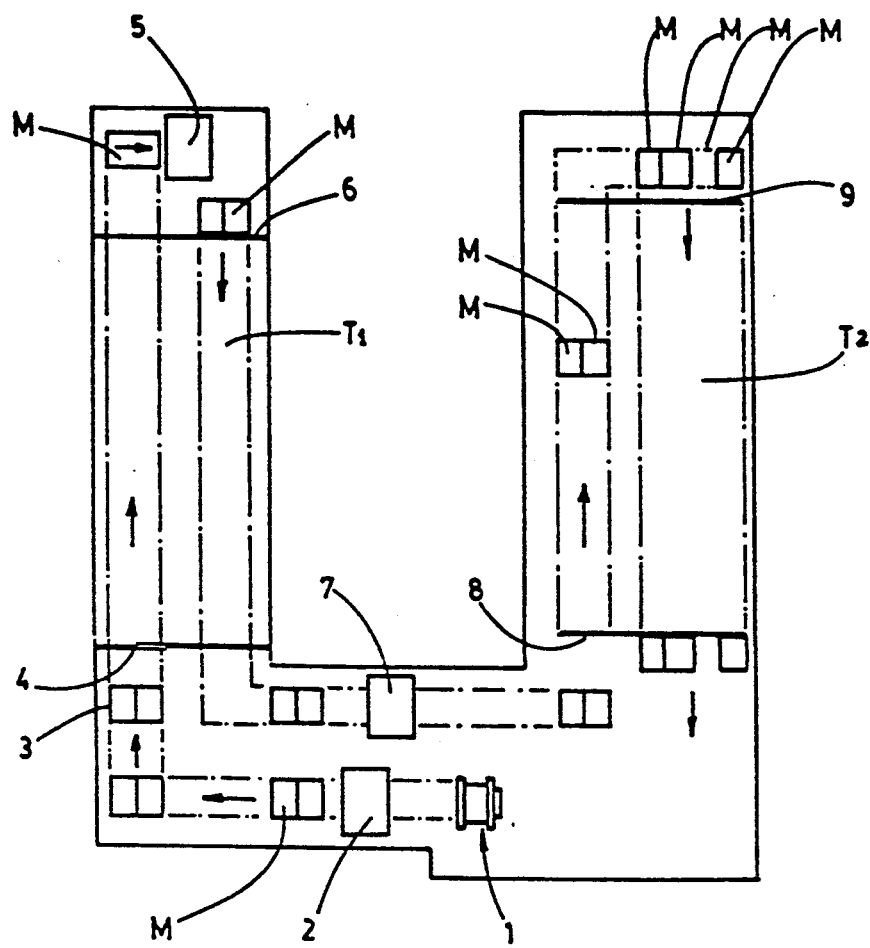
FIG. 1 is a schematic top plan view of a forming plant provided in accordance with the present invention.

The travel sequence of molds provided in accordance with the present invention is schematically shown in plan in FIG. 1.

First, the mold pusher 1 feeds the forming line delivering one mold with each stroke. The first dosing hopper 2 fills one mold at a time. The molds M are then arranged in a front of two molds to enter dumper 3 which turns them over simultaneously to form the "shell" of the candy. At the outlet of dumper 3, the two molds enter a first section 4 of first cooling tunnel T1. Although not illustrated in particular, mold pushers may be strategically disposed along the processing line to move molds to and through the system.

At the outlet of first cooling tunnel T1, the molds are pushed one by one to a second doser 5 where they receive fill. Once the molds leave the second doser, they are arranged in a front of two molds to simultaneously enter second section 6 of cooling tunnel T1.

As the molds leave the second section of the first cooling tunnel T1, they are pushed one by one to the third dosing hopper 7 where filling of the molds is completed. Although not shown, a cleaning device may be provided for cleaning the surface of each mold after filling is completed. As the molds leave the second doser, they are arranged again in twos and thus enter the first section 8 of the second cooling tunnel T2 in pairs. Once the pairs of molds have traversed the first section of the second cooling tunnel, the molds are arranged in a front of four molds and are pushed to enter the second and final section 9 of second cooling tunnel T2. The four molds that come out of the second section of the second cooling tunnel are removed and stripped at a stripping station (not shown).

As is apparent from the foregoing, the travel sequence provided in accordance with the present invention allows the production capacity of the forming plant to be at least doubled without a substantial increase in size and for a minimum cost.

While the invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A method of mold displacement in a chocolate-forming plant of the fixed surface type including an upper fixed surface means for advancing molds along a predetermined path, at least one doser means for filling cavities of said molds, a dumping device for dumping dosed material from said cavities so as to form shells therewithin, and at least two cooling means of the single level type for cooling said molds, said method comprising the steps of:

(a) feeding the empty molds one by one to a first doser;
(b) filling the cavities of said molds with a molten chocolate material;
(c) dumping dosed material from two molds simultaneously to form shells therewithin;
(d) simultaneously feeding said two molds into a first section of said first cooling means;
(e) feeding the cooled molds one by one to a second doser;
(f) filling said shells in said cooled molds;
(g) simultaneously feeding two of said filled molds into a second section of said first cooling means;
(h) feeding said cooled filled molds one by one to a third doser;
(i) further filling said cooled filled molds;
(j) simultaneously feeding two of said further filled molds into a first section of said second cooling means; and
(k) simultaneously feeding four of said cooled, further filled molds into a second section of the second cooling means.

* * * * *